US011928869B2

(12) United States Patent
Li et al.

(10) Patent No.: US 11,928,869 B2
(45) Date of Patent: Mar. 12, 2024

(54) HISTORICAL MAP UTILIZATION METHOD BASED ON VISION ROBOT

(71) Applicant: AMICRO SEMICONDUCTOR CO., LTD., Guangdong (CN)

(72) Inventors: Ming Li, Guangdong (CN); Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 255 days.

(21) Appl. No.: 17/442,150

(22) PCT Filed: Nov. 9, 2019

(86) PCT No.: PCT/CN2019/116917
§ 371 (c)(1),
(2) Date: Sep. 23, 2021

(87) PCT Pub. No.: WO2020/207007
PCT Pub. Date: Oct. 15, 2020

(65) Prior Publication Data
US 2022/0165069 A1 May 26, 2022

(30) Foreign Application Priority Data
Apr. 12, 2019 (CN) .......................... 201910293078.X (51) Int. Cl.
*G06V 20/58* (2022.01)
*G01C 21/30* (2006.01)
(Continued)

(52) U.S. Cl.
CPC ........... *G06V 20/582* (2022.01); *G01C 21/30* (2013.01); *G06T 7/70* (2017.01); *G06V 10/74* (2022.01)

(58) Field of Classification Search
CPC ........ G06V 20/582; G06V 10/74; G06T 7/70; G06T 7/74; G01C 21/30; G01C 21/005;
(Continued)

(56) References Cited

U.S. PATENT DOCUMENTS 9,497,443 B1 11/2016 Sundheimer et al.
11,657,531 B1* 5/2023 Ebrahimi Afrouzi ....................... A47L 11/4091
382/284

(Continued)

FOREIGN PATENT DOCUMENTS

CN 101750080 A 6/2010
CN 106239504 A 12/2016
(Continued)

OTHER PUBLICATIONS

Machine Translation of CN-109507995 (Year: 2019).*

*Primary Examiner* — Aniss Chad
*Assistant Examiner* — Christopher George Fees
(74) *Attorney, Agent, or Firm* — Samson G. Yu (57) ABSTRACT

The disclosure discloses a historical map utilization method based on a vision robot, including: S1, the vision robot is controlled to continuously collect image of a preset road sign of a preset working area, and road sign information of the preset road sign is obtained; S2, the obtained road sign information is transmitted to a first map positioning system and a second map positioning system; S3, the first map positioning system and the second map positioning system are controlled to respectively process corresponding road sign information, thereby obtaining first pose information and second pose information; S4, the first pose information and the second pose information under the same preset road sign are selected, and a transformation relationship formula of the first pose information and the second pose information is calculated; and S5, the historical map is controlled to perform a corresponding transformation operation, and subsequent motion control is performed.

5 Claims, 2 Drawing Sheets

(51) Int. Cl.
*G06T 7/70* (2017.01)
*G06V 10/74* (2022.01)

(58) Field of Classification Search
CPC ............ G01C 21/3807; G01C 21/3833; G01C 21/3885; G05D 1/0246; G05D 1/0274; G05D 2201/0203; A47L 11/4011; A47L 2201/04; B25J 9/16; B25J 9/1664; B25J 9/1697

See application file for complete search history.

(56) References Cited

U.S. PATENT DOCUMENTS

| | | | | |
|---|---|---|---|---|
| 2007/0198184 | A1* | 8/2007 | Yoshioka | ............ G09B 29/106 |
| | | | | 701/426 |
| 2018/0297207 | A1* | 10/2018 | Huang | ................... G06V 20/10 |
| 2021/0180959 | A1* | 6/2021 | Muto | ................... G08G 1/0112 |
| 2023/0266129 | A1* | 8/2023 | Ahn | ........................ G01S 19/45 |
| | | | | 701/412 |

FOREIGN PATENT DOCUMENTS

| | | | | | |
|---|---|---|---|---|---|
| CN | 107564062 | A | | 1/2018 | |
| CN | 108413975 | A | | 8/2018 | |
| CN | 108921893 | A | | 11/2018 | |
| CN | 109507995 | A | * | 3/2019 | ............ G01C 21/00 |
| CN | 109507995 | A | | 3/2019 | |
| CN | 110000786 | A | | 7/2019 | |
| JP | 2009512088 | A | | 3/2009 | |
| JP | 2009157430 | A | | 7/2009 | |
| JP | 2016177749 | A | | 10/2016 | |

\* cited by examiner

HISTORICAL MAP UTILIZATION METHOD BASED ON VISION ROBOT

CROSS REFERENCE TO RELATED APPLICATIONS

The present disclosure claims priority of Chinese Patent Application No. 201910293078.X, filed on Apr. 12, 2019, entitled "Historical map utilization method based on vision robot", the contents of which are hereby incorporated by reference in its entirety.

TECHNICAL FIELD

The disclosure belongs to the technical field of intelligent control, and particularly relates to a historical map utilization method based on a vision robot.

BACKGROUND

Each time when a traversal is completed in the same working area, a robot frequently rebuilds a map or updates in an incremental mapping mode, but after updating, a new map is generated, so that an operation relative to an original map also fails along with the change of the map. For example, for a sweeping robot, if the map is changed, the last incomplete sweep record also fails, and tasks (for example, breakpoint continued sweep) cannot be performed. The working efficiency of a sweeper is reduced, and each time when the sweeper is restarted to work in the same working area, a physical position and a motion direction of the vision robot are likely to change relative to the ending of the last task. Or, a current position and a corresponding scene point in the map matched with the current position are approximately located at the same position. However, it is impossible for a vision sensor to completely keep the same pose during the two times of collection, thereby leading to the fact that the direction indicated by a read pre-built historical map does not correspond to the direction of the current position of the vision robot. Therefore, how to utilize the pre-reserved historical map in the same working area for path planning so that the historical map is matched with an actual physical environment becomes an urgent problem to be solved in the conventional art.

SUMMARY

A historical map utilization method based on a vision robot is provided. The historical map utilization method is used for controlling a first map positioning system based on a current map and a second map positioning system based on a historical map to work independently from each other. The historical map utilization method includes that: S1, the vision robot is controlled to continuously collect at least one image of a preset road sign of a preset working area, and road sign information of the preset road sign is obtained from at least one image; S2, the road sign information obtained from S1 is simultaneously transmitted to a first map positioning system and a second map positioning system; S3, the first map positioning system is controlled to process corresponding road sign information according to a matching algorithm so as to obtain first pose information, and simultaneously, the second map positioning system is controlled to process the corresponding road sign information according to the matching algorithm so as to obtain second pose information; S4, the first pose information and the second pose information under the same preset road sign are selected, and a transformation relationship formula of the first pose information and the second pose information is calculated; and S5, the historical map is controlled to perform a corresponding transformation operation according to the transformation relationship formula, and subsequent motion control is performed by utilizing a transformed historical map as a reference. The historical map is an environment map which is built in advance and stored in a map storage medium and corresponds to the preset working area, and the current map is a environment map built in real time in the preset working area. The map storage medium is a storage unit within the system of the vision robot.

Further, S3 further includes that the first pose information is output from the first map positioning system to a first buffer memory space for waiting to be read for positioning, the first buffer memory space caching map attribute information of the current map in real time; and the second pose information is output to a second buffer memory space from the second map positioning system for waiting to be read, the second buffer memory space storing the map attribute information corresponding to the historical map. The map attribute information includes a map identifier used for marking map data of the map storage medium, the number of road signs, a two-dimensional grid map, road sign information used for performing vision positioning, pose information output by transforming the road sign information, and check values of the foregoing data. The pose information includes a position coordinate and an azimuth angle.

Further, at an initial moment of turning on the vision robot or at the moment of starting traversing the preset working area each time, the map attribute information corresponding to the historical map is read from the map storage medium.

Further, between S3 and S4, the method further includes that: the map attribute information of the historical map is read, thereby obtaining the number of the road signs corresponding to the historical map; and whether a difference value between the number of the road signs of the preset road signs obtained in S1 and the read number of the road signs is greater than a first preset number threshold is judged, In case that the read number of the road signs is greater than the first preset number threshold, the map attribute information of the historical map is read from the map storage medium to the second buffer memory space, S1 is returned, otherwise, S4 is entered. The technical solution is used for judging the effectiveness of the second pose information based on the historical map, and ensuring that the positioning information processed under a coordinate system of the historical map may represent the position information of the vision robot.

Further, a control method of reading the map attribute information of the historical map includes that: S401, whether the historical map exists in the map storage medium is judged according to the map identifier, In case that the historical map exists in the map storage medium, S402 is entered, otherwise, S410 entered; S402, whether the number of the corresponding road signs in the map storage medium is greater than a second preset number threshold is judged, In case that the number of the corresponding road signs in the map storage medium is greater than the second preset number threshold, S403 is entered, otherwise, S410 is entered; S403, whether the number of the corresponding road signs in the map storage medium is greater than the number of the corresponding road signs in the second buffer memory space is judged, In case that the number of the corresponding road signs in the map storage medium is greater than the number of the corresponding road signs in the second buffer memory space, S404 is entered, otherwise, S410 is entered; S404, the map attribute information stored in the second buffer memory space is cleared, the corresponding map attribute information is read from the map storage medium, the map attribute information is buffered to the second buffer memory space, and then S405 is entered; S405, a check value of data corresponding to the map attribute information buffered in the second buffer memory space is calculated, the check value is compared with a matched check value read from the map storage medium, if the check values is the same as the matched check value, the data read from the map storage medium is determined to be correct, then the second map positioning system is controlled to process the map attribute information in the second buffer memory space so as to obtain new second pose information, then S406 is entered, otherwise, the data read from the map storage medium is determined to be incorrect; and S406, the second pose information is read from the second buffer memory space, and then S4 is entered.

Further, the first buffer memory space and the second buffer memory space are buffer memory spaces applied and developed by the system within the vision robot and are linear tables. The first pose information is stored in the first buffer memory space in a C++ associative container mode, the second pose information is stored in the second buffer memory space in the C++ associative container mode, and key values corresponding to the first pose information and the second pose information in the memory spaces correspond to id numbers of the road sign information. The key value and id number are configured in the C++ associative container.

Further, S4 further includes that: the second map positioning system is controlled to process a group of road sign images of the same preset road sign to obtain preset number of pose information, then maximum value and minimum value are removed, and an average value of the rest data is taken as one piece of second pose information which plays a role in positioning; and simultaneously, the first map positioning system is controlled to process a group of road sign images of the same preset road sign to obtain preset number of pose information, then maximum value and minimum value are removed, and the average value of the rest data is taken as one piece of first pose information which plays a role in positioning. Error interference caused by positioning data is reduced.

Further, the first map positioning system and the second map positioning system work independently from each other and are internally built with the preset matching algorithm to drive processing of the road sign information. According to the technical solution, the positioning of the historical map is controlled to be independent of the positioning of the current map on software, and no coupling exists therebetween.

Further, in S4, the transformation relationship formula includes a transformation relationship formula composed of a rotation matrix and a translation vector, and the transformation operation includes controlling the historical map to rotate and translate.

DETAILED DESCRIPTION OF THE EMBODIMENTS

The technical solution in the embodiment of the disclosure will be described below in detail with reference to the accompanying drawings in the embodiment of the disclosure.

The embodiment of the disclosure provides a historical map utilization method based on a vision robot. The historical map utilization method is used for controlling a first map positioning system based on a current map and a second map positioning system based on the historical map to work independently from each other. After road sign information is generated at a front end of the map positioning system, the road sign information is respectively sent to the positioning system of the historical map and the positioning system of the current map for conversion processing, and the positioning information of the vision robot is generated by the foregoing map positioning system. Specifically: according to the road sign information of the historical map, a current coordinate and a current direction of the vision robot on the historical map are positioned, a final positioning result is sent after map effectiveness judgment and is used for rotating and translating the historical map, and the rotated and translated historical map is used as a reference map for motion control, so that the path planning of the vision robot is more intelligent.

A basic concept of the historical map utilization method provided by the embodiment of the disclosure includes that S1, the vision robot is controlled to collect at least one image of a preset road sign of a preset working area, and road sign information of the preset road sign is obtained from at least one image. The preset road sign may be all vision road signs in the preset working area or vision road signs in a local area, and it is ensured that the road sign information of the obtained preset road sign has integrity and rationality. It is to be noted that a road sign is used for describing a manually set marker in an environment.

S2, the road sign information obtained in S1 is simultaneously transmitted to a positioning system of the historical map and a positioning system of the current map. In the embodiment of the disclosure, the map positioning system may be divided into the first map positioning system used for processing historical map information and the second map positioning system used for processing current map information. Both the first map positioning system and the second map positioning system are connected with an image collection sensor and used for transmitting a currently collected road sign image to the first map positioning system and the second map positioning system respectively. The map positioning system completes robot positioning by means of the vision road sign information and has a signal connection relationship with the image collection sensor. The road sign information is feature point information and depth information extracted from the road sign image collected by the image collection sensor.

S3, the first map positioning system is controlled to process corresponding road sign information according to a preset matching algorithm, thereby obtaining first pose information under a current map coordinate system; simultaneously, the second map positioning system is controlled to process corresponding map attribute information according to the preset matching algorithm, thereby obtaining second pose information under a historical map coordinate system. In the embodiment, the preset matching algorithm is a road sign positioning matching algorithm and is used for completing feature matching between the currently collected road sign image and the road sign image in a road sign database. A feature matching algorithm adopted in the embodiment of the disclosure is a conventional feature point matching algorithm, and then the map positioning system calculates a position coordinate and an azimuth angle of the vision robot according to a matching result by virtue of a geometrical relationship and determines the position coordinate and the azimuth angle as the pose information. Thus, the first map positioning system outputs the first pose information under the coordinate system of the current map. The first pose information includes a first coordinate and a first direction angle. The second map positioning system outputs the second pose information under the coordinate system of the historical map. The second pose information includes a second coordinate and a second direction angle. Both the road sign database of the first map positioning system and the road sign database of the second map positioning system store a group of road sign images obtained by exploring and accessing the same preset road sign many times. The first map positioning system and the second map positioning system independently compute respective input image and road sign information of the preset road sign, and no coupling relationship exists between the two systems.

The foregoing historical map and the current map include a map in which an environment is abstracted into a series of road signs. The road signs represent scene points in an indoor environment. The road sign image in the road sign database includes a group of road sign images obtained by exploring and accessing the same physical position many times under different conditions, for example, a ground medium, illumination, and the like.

Preferably, the current map and the historical map contain a map identifier for marking map data of the map storage medium, the number of the road signs, a two-dimensional grid map, the road sign information used for performing vision positioning, the pose information output by transforming the road sign information, and check values of the foregoing data. The pose information includes a mixed environment map of map attribute information of the position coordinate and the azimuth angle. The two-dimensional grid map is a global grid map, a central point (w/2, h/2) thereof is an origin of the vision robot, w is the width of the grid map, and h is the height of the grid map. The map storage medium is a storage unit within the system of the vision robot and is specially configured to store the map data (in particular, the map attribute information) generated by the vision robot during synchronous positioning and instant mapping.

S4, the first pose information and the second pose information under the same preset road sign are selected, and a transformation relationship formula of the first pose information and the second pose information is calculated. Preferably, the transformation relationship formula includes a rotation matrix R and a translation vector T between the current map and the historical map, and represents a transformation relationship between poses of the same preset road sign on the current map and under the historical map.

S5, the historical map is controlled to perform a corresponding transformation operation according to the transformation relationship formula, and subsequent motion control is performed by utilizing a transformed historical map as a reference. The historical map is read from the map storage medium to a buffer space while performing the transformation operation. The historical map is updated by the current map in the map storage medium. The transformed historical map is used by the vision robot for subsequent motion path planning. Whereas the historical map updated in the map storage medium waits to be read for performing similarity judgment or participate in the calculation of the foregoing transformation relationship formula. Then, the historical map after the transformation operation is updated and displayed to a client.

In the embodiment, the coordinate system where the historical map is located is controlled to rotate the rotation angle calculated in S4, and then the coordinate system is translated along with the size and direction of the translation vector T calculated in S4, so that rotation and translation operations of the historical map may be realized; and then the map is uploaded to a user device side (for example, a mobile phone app), the transformed historical map is updated and displayed, and then the vision robot is directly controlled in a mobile phone to navigate to a certain room even if the room area is not marked as cleaned in a current state. According to the transformed historical map, a user may predict a position of an obstacle, and then select different sweeping sequences and directions in combination with terrain, thereby controlling intelligent motion planning of the vision robot by utilizing the historical map. The user is helped to perform path planning according to the historical map on a client interface. The historical map is an environment map which is built in advance and stored in a map storage medium and corresponds to the preset working area, and the current map is a environment map built in real time in the preset working area.

According to the embodiment of the disclosure, the effectiveness of the historical map of the robot may be kept, that is, the vision robot is controlled to obtain an environment feature of the preset working area in advance by means of the historical map, so that the vision robot has learning capability on a surrounding environment, and the intelligent level of the path planning is improved. Meanwhile, a more accurate navigation map is built, and the stability of the map is improved.

As one embodiment, after the vision robot completes a traversal in the preset working area, the historical map is stored to be directly read next time for use, but a physical position and a direction each time, when the robot is started, are likely to change frequently. Because The direction indicated by a read historical map marking position does not correspond to the direction of the current position of a machine. Therefore, the position and the direction of the machine must be repositioned on the historical map by means of the vision system, so that the historical map is matched with an actual physical environment. The current position needs to be compared with a pre-stored map, the key is to judge whether the current position is located at a recorded position in the pre-stored map, and whether the basis of the historical map needs to be updated is determined according to a judgment result.

Figure 1:
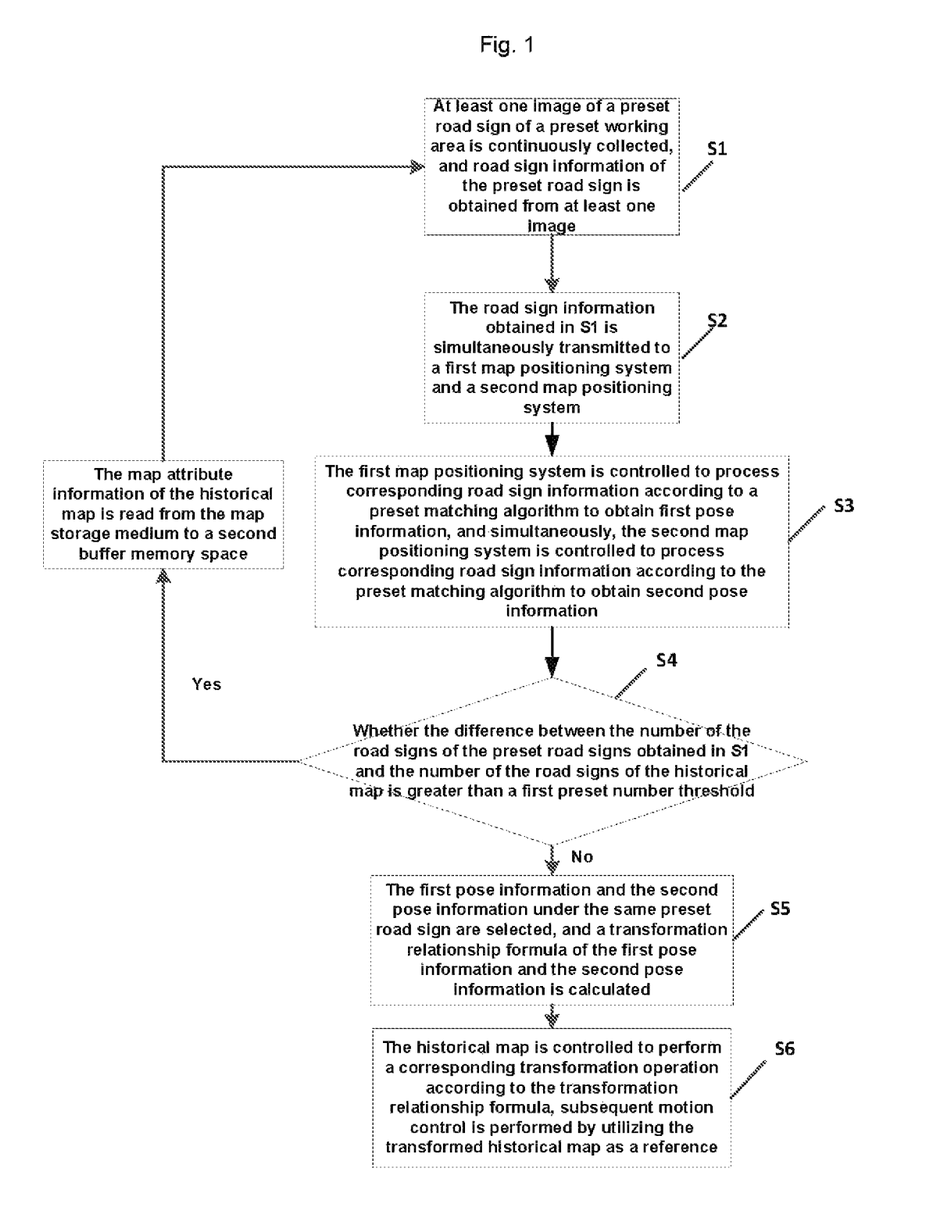
FIG. 1 is a flow chart of a historical map utilization method based on a vision robot.

As shown in FIG. 1, the historical map utilization method is used for controlling a first map positioning system based on a current map and a second map positioning system based on a historical map to work independently from each other. The historical map utilization method provided by the embodiment of the disclosure includes the following operations.

S1, the vision robot is controlled to continuously collect at least one image of a preset road sign of a preset working area, road sign information of the preset road sign is obtained from at least one image, and then S2 is entered.

S2, the road sign information obtained in S1 is simultaneously transmitted to the first map positioning system and the second map positioning system.

S3, the first map positioning system is controlled to process corresponding road sign information according to a preset matching algorithm to obtain first pose information, and simultaneously, the second map positioning system is controlled to process corresponding road sign information according to the preset matching algorithm to obtain second pose information. Then, S4 is entered.

S4, whether the difference between the number of the road signs of the preset road signs obtained in S1 and the number of the road signs of the historical map is greater than the first preset number threshold, that is, whether the second pose information meets a preset matching condition of map attribute information corresponding to the historical map, In case that the second pose information meets a preset matching condition of map attribute information, the map attribute information of the historical map is read from the map storage medium to a second buffer memory space, S1 is returned, otherwise, S5 is entered.

In particular, in the case that the difference between the number of the two types of road signs is obvious, this indicates that the historical map is updated and replaced by a newly written current map, the map attribute information written in the map storage medium is changed, at this time, data needs to be reread from the map storage medium to the buffer memory space to be provided for the map positioning system to use, otherwise, the historical map is directly read from the buffer memory space to be used by the map positioning system.

The first preset number threshold is used for measuring the matching degree of the number of the preset road signs corresponding to the second pose information and the road signs with the same road sign information in the historical map, and the smaller the first preset number threshold is, the more the number of the road signals in all currently collected road signals matched with all road signs in the historical map is. This step is used for matching a currently built map with the historical map to determine whether the robot is in a historical environment or a new environment in the preset working area. When the vision robot just enters the preset working area to work and the map storage medium does not store the map attribute information corresponding to the historical map, the number of the corresponding road signs in the historical map is 0, so that the embodiment is suitable for a scene that the vision robot has completed at least one traversal in the preset working area. According to the historical map utilization method, the degree of familiarity of the vision robot with the preset working area is improved.

S5, the first pose information and the second pose information under the same preset road sign are selected, and a transformation relationship formula of the first pose information and the second pose information is calculated. Specifically, an angle of the first pose information and the second pose information is calculated, and coordinate variable quantity of the first pose information and the second pose information is calculated. The first map positioning system may output the corresponding first pose information under a plurality of road signs, and the second map positioning system may output the corresponding second pose information under a plurality of road signs, thereby obtaining position information when the vision robot collects different road signs.

S6, the historical map is controlled to perform a corresponding transformation operation according to the transformation relationship formula obtained in S5, subsequent motion control is performed by utilizing a transformed historical map as a reference, and then the historical map after the transformation operation is updated and displayed to a user side. According to the transformed historical map, a position of an obstacle may be marked on the user side, and then a reasonable sweeping sequence and direction are planned in combination with current environment terrain, thereby controlling the vision robot to perform motion planning by utilizing the historical map. The vision robot may be familiar with a surrounding traversed environment during motion, and the learning capability of the robot is continuously improved.

It will be appreciated that after a complete map is built, the historical map is matched with the newly created map to obtain similarity. If the similarity is greater than a certain threshold, the newly created map is considered to be the previous map, and if the similarity is smaller than the certain threshold, the environment is considered to be changed, the map in the map storage medium may be replaced, and the historical map is buffered in the memory space. Each map corresponds to one piece of historical working and interaction data, and an iterative alternating process is achieved. Synchronous positioning and instant mapping are realized. It is to be noted that the foregoing number threshold may be set according to an actual situation. The map attribute information includes a map identifier used for marking map data of the map storage medium, the number of road signs, a two-dimensional grid map, road sign information used for performing vision positioning, pose information output by transforming the road sign information, and check values of the foregoing data. The pose information includes a position coordinate and an azimuth angle. According to the technical solution of the disclosure, the effectiveness of the second pose information is judged based on the historical map, and it is ensured that the positioning information processed under a coordinate system of the historical map may represent the position information of the vision robot.

Preferably, in S3, the first pose information is output from the first map positioning system to a first buffer memory space for waiting to be read for positioning or writing to the map storage medium. The first buffer memory space stores map attribute information corresponding to the current map. The second pose information is output to a second buffer memory space from the second map positioning system and is used for waiting to be read. The second buffer memory space stores the map attribute information corresponding to the historical map. In the same preset working area, when the environment where the vision robot is located is detected to change, the historical map is updated by the current map, and the second buffer memory space needs to read and update from the map storage medium. The first buffer memory space and the second buffer memory space are buffer memory spaces applied and developed by the system within the vision robot. Therefore, when a difference value between the number of the road signs of the preset road signs obtained in S1 and the number of the road signs read from the second buffer memory space is greater, the first pose information is read from the first buffer memory space and then S5 is entered. According to the embodiment of the disclosure, the second map positioning system and the first map positioning system are controlled to process data of different map systems respectively, and dynamic change of the processed data is supported.

Preferably, at an initial moment of turning on the vision robot or at the moment of starting traversing the preset working area each time, the map attribute information corresponding to the historical map is read from the map storage medium first. The historical map data pre-built in the map storage medium is read and stored in the second buffer memory space, so that the subsequent effectiveness judgment of the map attribute information of the historical map is facilitated, the technical effect of reading the data as early as possible to be provided for the map positioning system to use is achieved, and the updating and positioning processing speed of the historical map is accelerated.

As one embodiment, before S4, the map attribute information of the historical map needs to be read, and the map attribute information corresponding to the historical map may be read from the map storage medium, thereby obtaining the number of the road signs corresponding to the historical map. The map attribute information corresponding to the historical map may also be read from the second buffer memory space, thereby obtaining the number of the road signs corresponding to the historical map. A specific reading method may refer to a control method of reading the map attribute information of the historical map shown in FIG. 2, and the method includes the following steps.

Figure 2:
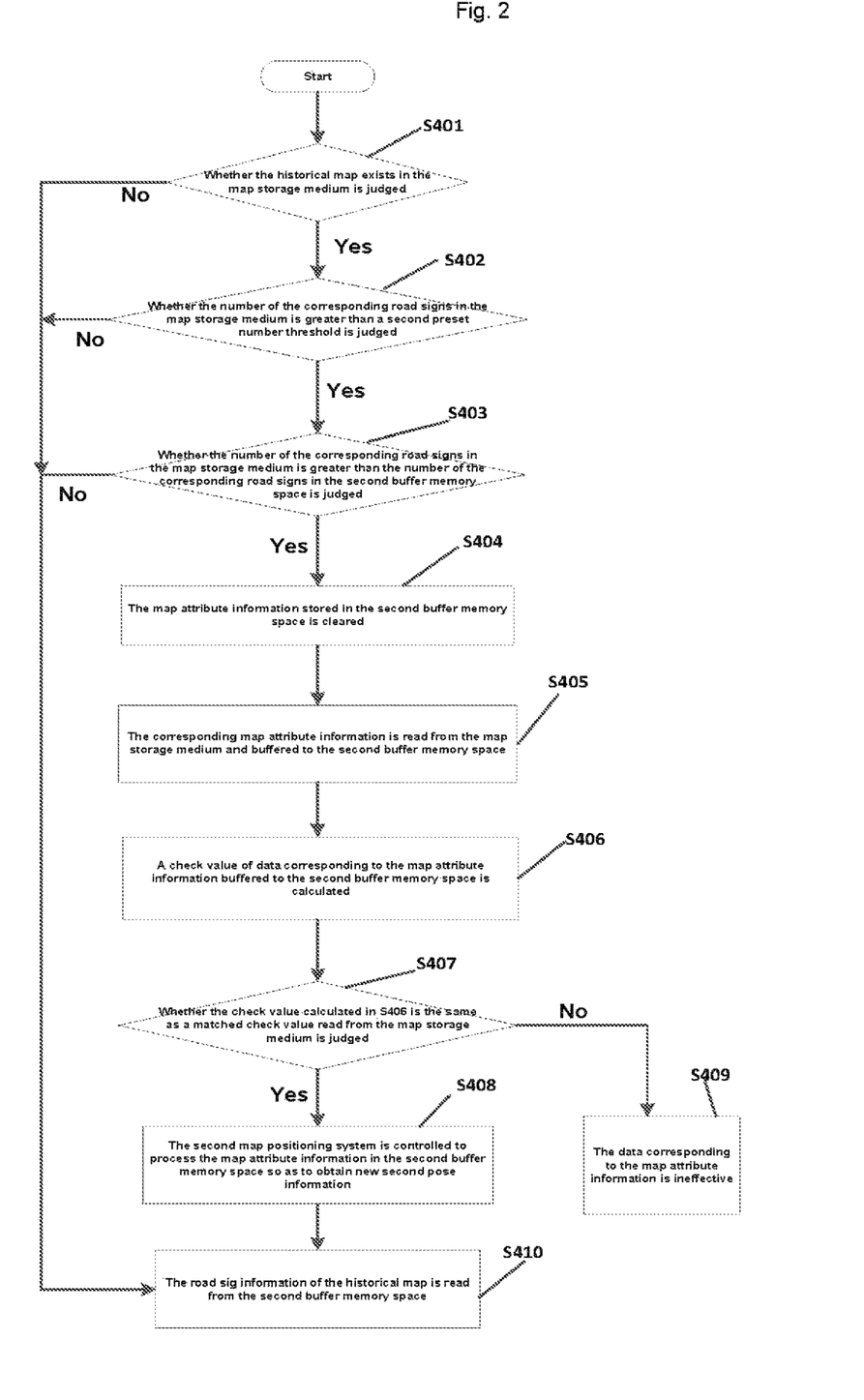
FIG. 2 is a flow chart of a control method of reading map attribute information of a historical map.

S401, whether the historical map exists in the map storage medium is judged according to the map identifier, In case that the historical map exists in the map storage medium, S402 is entered, otherwise, S410 is entered. The map identifier is an identifier of the map data.

S402, whether the number of the corresponding road signs in the map storage medium is greater than the second preset number threshold is judged, In case that the number of the corresponding road signs in the map storage medium is greater than the second preset number threshold, S403 is entered, otherwise, S410 is entered. In the embodiment, the numerical value of the second preset number threshold is at least greater than 2. The read road sign information is quantized, and the rationality and the integrity of the map are improved.

S403, whether the number of the corresponding road signs in the map storage medium is greater than the number of the corresponding road signs in the second buffer memory space is judged, In case that the number of the corresponding road signs in the map storage medium is greater than the number of the corresponding road signs in the second buffer memory space S404 is entered, otherwise, S410 is entered. In particular, under the same preset working area, when the number of the road signs stored in a current real-time buffer storage space is obviously different from the number of the originally stored road signs, it is determined that the historical map is not matched with the newly built map. In the preset working area, the actual physical environment detected by the vision robot is changed, it is determined that the currently collected map attribute information is changed relative to the historical map in the map storage medium. At this time, the currently collected map attribute information is written to the map storage medium to update the historical map. The currently collected map is updated in real time. At this time, in order to store the data for subsequent pose transformation data under the historical map, the data needs to be reread from the map storage medium to the second buffer memory space to be used as the second pose information, thereby waiting to be read to participate in the computation of the transformation relationship formula, and then the transformation operation is performed on the map coordinate system in combination with the calculated transformation relationship formula and further, the historical map is adjusted and transformed, so that the vision robot may plan a working path more suitable for the actual environment according to the transformed historical map.

S404, the map attribute information stored in the second buffer memory space is cleared, and then S405 is entered. S404, the influence of the map data before the actual physical environment detected by the vision robot is not changed is eliminated, thereby providing a corresponding storage space for the updated historical map in the second buffer memory space. At this time, the map attribute information of the current map is written to the map storage medium, so that the map attribute information of the historical map in the map storage medium has been replaced by the map attribute information of the current map.

S405, the corresponding map attribute information is read from the map storage medium, buffered to the second buffer memory space, and determined as new second position information. The first pose information corresponding to the current map is updated in real time. The historical map may be adjusted in combination with the transformation relationship formula of the new second position information and the first pose information, so that the map obtained by the vision robot is matched with the actual environment, and in particular, the corresponding current position information of the vision robot in the map is matched with the actual environment.

S406, a check value of data corresponding to the map attribute information buffered in the second buffer memory space is calculated, and then S407 is entered.

S407, whether the check value calculated in S406 is the same as a matched check value read from the map storage medium is judged, In case that the check value calculated in S406 is the same as a matched check value read from the map storage medium, the data read from the map storage medium is determined to be correct, then S408 is entered, otherwise, S409 is entered. In the embodiment of the disclosure, all map data corresponding to the map attribute information is provided with the corresponding check value, and when the data is written to the map storage medium, the corresponding check value is stored. When the data corresponding to the map attribute information is read from the map storage medium, one check value is recalculated according to the read data, and if the check value is equal to the check value pre-stored in the map storage medium, the read data is proved to be correct, otherwise, the data is read incorrectly.

S408, the second map positioning system is controlled to process the map attribute information in the second buffer memory space so as to obtain new second pose information, and in this step, the second map positioning system is also controlled to process the road sign information of the second buffer memory space according to the preset matching algorithm. Or, the pose information read by the map storage medium is taken as the second pose information and is buffered to the second buffer memory space, and then S410 is entered.

S409, the data read from the map storage medium is determined to be incorrect, that is, the data corresponding to the map attribute information stored in the map storage medium is ineffective.

S410, the second position information is read from the second buffer memory space to wait to participate in the calculation of the foregoing transformation relationship formula, and then S4 is entered.

According to the embodiment of the disclosure, a reading mode of the map attribute information of the historical map is determined by judging the difference between the map attribute information of the buffer memory space and the map storage medium, and the map reading efficiency is improved. The effectiveness of the historical map of the robot may be kept, and the learning capability of the vision robot on the map is effectively improved.

Preferably, the first buffer memory space and the second buffer memory space are buffer memory spaces applied and developed by the system within the vision robot and are special linear tables. The first pose information is stored in the first buffer memory space in a C++ associative container mode, the second pose information is stored in the second buffer memory space in the C++ associative container mode, and key values corresponding to the first pose information and the second pose information in the memory spaces correspond to id numbers of the road sign information, so that the key values corresponding to each road signal coordinate and road signal direction angle are the id numbers of the road sign information. The key value in the container is unique. According to the technical solution, the flexibility of managing the pose information by a memory is improved, and the efficiency of reading the buffer memory is improved. The road sign information is stored in the memory in the C++ associative container mode. An element in the associative container is stored and accessed according to a keyword. The associative container supports efficient keyword lookup and access. The associative container supports efficient keyword lookup and access. The road sign information is sequentially stored to a buffer area in a C++ sequential container mode, and the road sign pose information is stored in the C++ associative container mode. It is to be noted that the essential difference between the associative container and the sequential container is as follows that: the element in the associative container is stored and read through a key, while the element in the sequential container is stored and accessed sequentially through a position sequence of the element in the container. According to the embodiment of the disclosure, the road sign information may be stored and accessed according to a storage sequence stored in a map flash memory, and then the corresponding road sign pose information is read from the memory by searching and accessing the id number of the road sign information.

Preferably, in S5, the second pose information and the first pose information are the preset number of pose information obtained aiming at the same preset road sign. For the preset number of the second pose information, the second map positioning system is controlled to process a group of road sign images of the same preset road sign, thereby obtaining the preset number of pose information, then maximum value and minimum value are removed, and an average value of the rest data is taken as one piece of second pose information which plays a role in positioning; and simultaneously, for the preset number of the first pose information, the first map positioning system is controlled to perform matching processing on a group of road sign images of the same preset road sign, thereby obtaining the preset number of pose information, then the maximum value and the minimum value are removed, and the average value of the rest data is taken as one piece of first pose information which plays a role in positioning. Thus, an accurate road sign positioning feature is provided for the map, and the error interference caused by positioning data is reduced.

It is to be noted that in the foregoing embodiment, the first map positioning system and the second map positioning system work independently from each other and are internally built with the preset matching algorithm to drive processing of the road sign information. According to the technical solution, the positioning of the historical map is controlled to be independent of the positioning of the current map on software, and no coupling exists therebetween.

Preferably, in S5, the transformation relation formula includes a rotation matrix R and a translation vector T, and the transformation operation includes controlling the historical map to rotate and translate. According to the technical solution, the unification of the coordinate system of the current map and the coordinate system of the historical map is realized by virtue of a constraint relationship of the rotation matrix and the translation vector, so that the historical map is matched with the current position direction of the vision robot after rotation and translation transformation. Translation distance and a rotation angle are calculated. Specifically, since the road sign pose information (the first pose information and the second pose information) are both stored in a C++ associative container mode, the first pose information pose_new is used as one object element of the current map type in the first map positioning system and includes a first coordinate (pose_new. x, pose_new. y) and a first direction angle pose_new. angle. The second pose information pose_old is used as one object element of the current map type in the second map positioning system and includes a second coordinate (pose_old. x, pose_old. y) and a second direction angle pose_old. angle. The rotation matrix R and the translation vector T between the current map and the historical map included in the transformation relationship formula are as follows.

$$R = \begin{pmatrix} \cos(\text{angle}) & -\sin(\text{angle}) \\ \sin(\text{angle}) & \cos(\text{angle}) \end{pmatrix}$$

Based on the rotation matrix and the translation vector T=(x, y), the following equation may be derived.

angle=pose_old.angle−pose_new.angle.

x=pose_new.x−(pose_old.x*cos(angle)+ pose_old.y*sin(angle)).

y=pose_new.y−(pose_old.y*cos(angle)− pose_old.x*sin(angle)).

Where, angle represents the angle which the historical map needs to rotate, x represents the offset of the historical map on an x-axis, and y represents the offset of the historical map on a y-axis. The historical map is controlled to rotate the angle according to the angle and the offset, then x is translated along a direction of the x-axis, and then y is translated along the direction of the y-axis, so that the historical map is updated and displayed on the user side interface. Preferably, the vision robot of the embodiment of the disclosure further includes: an uploading module configured to upload the transformed historical map to a mobile device, for example, a cloud server or a mobile phone, and the like.

Compared with the sweeping robot in the conventional art, a new map is built at the user side each time when the sweeping robot works once in the same working area. However, the pre-built historical map under the embodiment of the disclosure is still kept in the user side in a working period, and when the current map and the historical map are changed, the historical map is transformed according to the transformation relationship formula, so that the vision robot may remember plane layout in the area and learns how to adjust and transform the historical map in the user side so as to plan a cleaning path according to this procedure when working next time.

In the foregoing S6, it is mentioned that the subsequent motion control is performed by utilizing a transformed historical map as a reference, for example: after a plan view is drawn and the historical map is transmitted to the user side, different rooms (for example, categories of a book room, a bedroom, an entertainment room, and the like) may be marked through the user side, so that when the vision robot is used as a sweeper, the whole room does not need to be swept everywhere every time, but targeted sweeping is performed according to a planned room area; and in addition, area division may be performed in the room according to the historical map, for example, if only one local area in the middle of a book room needs to be swept, a corresponding space only needs to be drawn on the user side, and then the vision robot is controlled to perform the targeted sweeping. During the reception of the subsequent motion control by the vision robot, the vision robot is gradually familiar with a traversed surrounding environment and the learning capability of the robot is continuously enhanced. The subsequent motion control may further include that: according to the transformed historical map, a position of an obstacle may be marked on the user side, and then a reasonable sweeping sequence and direction are planned in combination with current environment terrain, thereby controlling the vision robot to perform motion planning by utilizing the historical map. The vision robot may be familiar with the surrounding traversed environment during motion, and the learning capability of the robot is continuously improved.

Finally, it is to be noted that: the above embodiments are only intended to illustrate the technical solution of the disclosure and not to limit the same. Although the disclosure has been described in detail with reference to the preferred embodiments, those skilled in the art will appreciate that: modifications may be made to the specific embodiments of the disclosure or equivalent replacement may be performed on some of the technical features without departing from the spirit of the technical solution of the disclosure, and all those modifications and the equivalent replacement should be included within the scope of the technical solution as claimed by the disclosure.

What is claimed is:

1. A historical map utilization method based on a vision robot, wherein the historical map utilization method is used for controlling a first map positioning system based on a current map and a second map positioning system based on a historical map to work independently from each other, the historical map utilization method comprising:
   S1, controlling the vision robot to continuously collect at least one image of a preset road sign of a preset working area, and obtaining road sign information of the preset road sign from the least one image;
   S2, simultaneously transmitting the road sign information obtained in S1 to the first map positioning system and the second map positioning system;
   S3, controlling the first map positioning system to process corresponding road sign information according to a preset matching algorithm to obtain first pose information, and simultaneously controlling the second map positioning system to process corresponding road sign information according to the preset matching algorithm to obtain second pose information;
   S4, selecting the first pose information and the second pose information under the same preset road sign, and calculating a transformation relationship formula of the first pose information and the second pose information; and
   S5, controlling the historical map to perform a corresponding transformation operation according to the transformation relationship formula, and performing subsequent motion control by utilizing a transformed historical map as a reference;
   wherein the historical map is an environment map which is built in advance and stored in a map storage medium and corresponds to the preset working area, the current map is an environment map built in real time in the preset working area, and the map storage medium is one storage unit within a system of the vision robot,
   wherein S3 further comprises: outputting the first pose information from the first map positioning system to a first buffer memory space for waiting to be read for positioning, wherein the first buffer memory space caches map attribute information of the current map in real time; and
   outputting the second pose information to a second buffer memory space from the second map positioning system for waiting to be read, wherein the second buffer memory space stores map attribute information corresponding to the historical map;
   wherein, the map attribute information comprises a map identifier used for marking map data of the map storage medium, the number of road signs, a two-dimensional grid map, road sign information used for performing vision positioning, pose information output by transforming the road sign information, and check values of foregoing data, wherein the pose information comprises a position coordinate and an azimuth angle,
   between S3 and S4, further comprising:
   reading the map attribute information of the historical map, thereby obtaining the number of the road signs corresponding to the historical map; and
   judging whether a difference value between the number of the road signs of the preset road signs obtained in S1 and the read number of the road signs is greater than a first preset number threshold, In case that the number of the road signs of the preset road signs obtained in S1 and the read number of the road signs is greater than a first preset number threshold, reading the map attribute information of the historical map from the map storage medium to the second buffer memory space, returning to S1, otherwise, entering S4,
   wherein reading the map attribute information of the historical map comprises:
   S401, judging whether the historical map exists in the map storage medium according to the map identifier, In case that the historical map exists in the map storage medium, entering S402, otherwise, entering S406;
   S402, judging whether the number of the corresponding road signs in the map storage medium is greater than a second preset number threshold, In case that the number of the corresponding road signs in the map storage medium is greater than a second preset number threshold, entering S403, otherwise, entering S406;
   S403, judging whether the number of the corresponding road signs in the map storage medium is greater than the number of the corresponding road signs in the second buffer memory space, In case that the number of the corresponding road signs in the map storage medium is greater than the number of the corresponding road signs in the second buffer memory space, entering S404, otherwise, entering S406;
   S404, clearing the map attribute information stored in the second buffer memory space, reading the corresponding map attribute information from the map storage medium, caching the map attribute information to the second buffer memory space, and then entering S405;
   S405, calculating a check value of data corresponding to the map attribute information buffered in the second buffer memory space, comparing the check value with a matched check value read from the map storage medium, if the check value is the same as the matched check value, determining that data read from the map storage medium is correct, then controlling the second map positioning system to process the map attribute information in the second buffer memory space so as to obtain new second pose information, then entering S406, otherwise, determining that the data read from the map storage medium is incorrect; and S406, reading the second pose information from the second buffer memory space, and then entering S4.

2. The historical map utilization method based on a vision robot according to claim 1, wherein at an initial moment of turning on the vision robot or at a moment of starting traversing of the preset working area each time, reading the map attribute information corresponding to the historical map to the second buffer memory space once from the map storage medium.

3. The historical map utilization method based on a vision robot according to claim 1, wherein S4 further comprises: controlling the second map positioning system to process a group of road sign images of the same preset road sign to obtain preset number of pose information, then removing the maximum value and the minimum value, and taking an average value of the rest data as one piece of second pose information which plays a role in positioning; and simultaneously, controlling the first map positioning system to process a group of road sign images of the same preset road sign to obtain preset number of pose information, then removing maximum value and minimum value, and taking average value of rest data as one piece of first pose information which plays a role in positioning.

4. The historical map utilization method based on a vision robot according to claim 3, wherein the first map positioning system and the second map positioning system work independently from each other and are internally built with the preset matching algorithm to drive processing of the road sign information.

5. The historical map utilization method based on a vision robot according to claim 1, wherein in S4, the transformation relationship formula comprises a transformation relationship formula composed of a rotation matrix and a translation vector, the transformation operation comprising controlling the historical map to rotate and translate.

* * * * *